(12) United States Patent
Murugesan et al.

(10) Patent No.: US 11,188,039 B2
(45) Date of Patent: Nov. 30, 2021

(54) BUILDING MANAGEMENT SYSTEM WITH DYNAMIC ENERGY PREDICTION MODEL UPDATES

(71) Applicant: Johnson Controls Tyco IP Holdings LLP, Milwaukee, WI (US)

(72) Inventors: Sugumar Murugesan, Santa Clara, CA (US); Young M. Lee, Old Westbury, NY (US); Jaume Amores Llopis, Cork (IE)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 73 days.

(21) Appl. No.: 16/657,398

(22) Filed: Oct. 18, 2019

(65) Prior Publication Data
US 2021/0116874 A1    Apr. 22, 2021

(51) Int. Cl.
*G05B 13/04* (2006.01)
*G06Q 50/06* (2012.01)
*G01D 4/00* (2006.01)

(52) U.S. Cl.
CPC .......... *G05B 13/048* (2013.01); *G01D 4/004* (2013.01); *G06Q 50/06* (2013.01)

(58) Field of Classification Search
CPC .................. G05B 13/048; G05B 15/02; G05B 2219/2642; G06Q 50/06; G06Q 10/04; G01D 4/004
See application file for complete search history.

(56) References Cited

U.S. PATENT DOCUMENTS

| | | | |
|---|---|---|---|
| 7,580,775 B2 | 8/2009 | Kulyk et al. | |
| 7,894,946 B2 | 2/2011 | Kulyk et al. | |
| 8,183,995 B2 * | 5/2012 | Wang | H02J 3/14 340/539.1 |
| 8,527,108 B2 | 9/2013 | Kulyk et al. | |
| 8,527,109 B2 | 9/2013 | Kulyk et al. | |
| 8,918,223 B2 | 12/2014 | Kulyk et al. | |
| 9,110,647 B2 | 8/2015 | Kulyk et al. | |
| 9,703,339 B2 | 7/2017 | Kulyk et al. | |
| 10,025,337 B2 * | 7/2018 | Hancock | G01R 21/1331 |
| 10,101,731 B2 | 10/2018 | Asmus et al. | |
| 10,139,877 B2 | 11/2018 | Kulyk et al. | |

(Continued)

OTHER PUBLICATIONS

U.S. Appl. No. 15/900,459, filed Feb. 20, 2018, Johnson Controls Technology Company.

(Continued)

*Primary Examiner* — Ramesh B Patel
(74) *Attorney, Agent, or Firm* — Foley & Lardner LLP

(57) ABSTRACT

A building management system including building equipment operable to affect a variable state or condition of a building. The building management system includes a controller including a processing circuit. The processing circuit is configured to obtain an energy prediction model (EPM) for predicting energy requirements over time. The processing circuit is configured to monitor one or more triggering events to determine if the EPM should be retrained. The processing circuit is configured to, in response to detecting that a triggering event has occurred, identify updated values of one or more hyper-parameters of the EPM. The processing circuit is configured to operate the building equipment based on the EPM.

20 Claims, 9 Drawing Sheets

(56) References Cited

U.S. PATENT DOCUMENTS

| | | | | |
|---|---|---|---|---|
| 2008/0272934 | A1* | 11/2008 | Wang | G08B 25/10 340/870.11 |
| 2009/0063122 | A1 | 3/2009 | Nasle | |
| 2011/0082597 | A1 | 4/2011 | Meagher | |
| 2012/0271475 | A1* | 10/2012 | Wang | H02J 13/00002 700/295 |
| 2013/0038468 | A1* | 2/2013 | Wang | H02J 13/00004 340/870.02 |
| 2014/0203933 | A1* | 7/2014 | Wang | G06Q 30/0621 340/539.14 |
| 2015/0051749 | A1* | 2/2015 | Hancock | G06Q 50/06 700/295 |
| 2015/0088576 | A1 | 3/2015 | Steven et al. | |
| 2015/0302318 | A1 | 10/2015 | Chen et al. | |
| 2015/0316907 | A1 | 11/2015 | Elbsat et al. | |
| 2018/0314220 | A1 | 11/2018 | Kumar et al. | |
| 2019/0079473 | A1 | 3/2019 | Kumar et al. | |
| 2019/0316802 | A1 | 10/2019 | Alanqar et al. | |
| 2019/0347577 | A1* | 11/2019 | Ba | H02J 13/00002 |
| 2020/0218233 | A1 | 7/2020 | Elbsat et al. | |
| 2020/0333767 | A1* | 10/2020 | Engelstein | H04Q 9/00 |

OTHER PUBLICATIONS

U.S. Appl. No. 16/240,466, filed Jan. 4, 2019, Johnson Controls Technology Company.

U.S. Appl. No. 16/240,028, filed Jan. 4, 2019, Alanqar et al.

U.S. Appl. No. 16/513,054, filed Jul. 16, 2019, Johnson Controls Technology Company.

Batterman, Stuart, Review and Extension of CO2-Based Methods to Determine Ventilation Rates with Application to School Classrooms, International Journal of Environmental Research and Public Health, Feb. 4, 2017, 22 pages.

Chen, Xiao et al., Occupant Feedback Based Model Predictive Control for Thermal Comfort and Energy Optimization: A Chamber Experimental Evaluation. Applied Energy 164. 2016, 341-351 pages.

Kang et al., Novel Modeling and Control Strategies for a HVAC System Including Carbon Dioxide Control, Jun. 2, 2014, 19 Pages.

Lampinen, Markku J. Thermodynamics of Humid Air. Sep. 2015. 39 Pages.

Ljung, L. (1999). System Identification: Theory for the User, 2nd ed. (Prentice Hall PTR, Upper Saddle River).

Luo, Xiaoyan. Maximizing Thermal Comfort and International Design. Loughborough University. Jan. 18, 2019. 4 Pages.

Sama Aghniaey et al., The Assumption of Equidistance in the Seven-Point Thermal Sensation Scale and a Comparison between Categorical and Continuous Metrics. University of Georgia College of Engineering, Jan. 18, 2019. 4 Pages.

Sudhakaran, Saurabh; Shaurette Mark. Temperature, Relative Humidity, and CarbonDioxide Modulation in a Near-Zero Energy Efficient Retrofit House. Purdue University. 2016, 11 Pages.

Weekly, Kevin et al., Modeling and Estimation of the Humans' Effect on the $CO_2$ Dynamics Inside a Conference Room. IEEE Transactions on Control Systems Technology, vol. 23, No. 5, Sep. 2015, 12 pages.

U.S. Appl. No. 16/513,054, filed Jul. 16, 2019, Johnson Controls Technology Co.

Aghniaey et al., "The Assumption of Equidistance in the Seven-Point Thermal Sensation Scale and a Comparison between Categorical and Continuous Metrics," University of Georgia College of Engineering, Jan. 18, 2019, 4 pages.

Batterman et al., "Review and Extension of CO2-Based Methods to Determine Ventilation Rates with Application to School Classrooms," International Journal of Environmental Research and Public Health, Feb. 4, 22 pages.

Chen et al., "Occupant Feedback Based Model Predictive Control for Thermal Comfort and Energy Optimization: A Chamber Experimental Evaluation," Applied Energy, 2016, 164, pp. 341-351.

Kang et al., "Novel Modeling and Control Strategies for a HVAC System Including Carbon Dioxide Control," Energies, Jun. 2, 2014, 7, pp. 3599-3617.

Lampinen, "Thermodynamics of Humid Air," Sep. 2015, 39 Pages.

Ljung, System Identification: Theory for the User, 1999, 2nd ed., Prentice Hall PTR, Upper Saddle River, 63 pages.

Luo, "Maximizing Thermal Comfort and International Design: Predicting Thermal Comfort in Mixed-mode Office Building in the UK," Loughborough University, Jan. 18, 2019, 4 pages.

Sudhakaran et al., "Temperature, Relative Humidity, and Carbon-Dioxide Modulation in a Near-Zero Energy Efficient Retrofit House," Purdue University, 2016, 11 pages.

Weekly et al., "Modeling and Estimation of the Humans' Effect on the CO2 Dynamics Inside a Conference Room," IEEE Transactions on Control Systems Technology, Sep. 2015, 23.5, 12 pages.

\* cited by examiner

BUILDING MANAGEMENT SYSTEM WITH DYNAMIC ENERGY PREDICTION MODEL UPDATES

BACKGROUND

The present disclosure relates generally building equipment of a building and more particularly to a building management system for operating building equipment based on artificial intelligence models.

Operating building equipment can be costly for building owners and can consume large amount of energy from an electricity grid. If operated based on standard control schemes (e.g., a constant setpoint), building equipment may consume unnecessary amounts of electricity and/or other resources. Further, due to changes in energy costs over time, building owners may be forced to pay unnecessary amounts to operate building equipment.

SUMMARY

One implementation of the present disclosure is a building management system, according to some embodiments. The building management system includes building equipment operable to affect a variable state or condition of a building, according to some embodiments. The building management system includes a controller including a processing circuit, according to some embodiments. The processing circuit is configured to obtain an energy prediction model (EPM) for predicting energy requirements over time, according to some embodiments. The processing circuit is configured to monitor one or more triggering events to determine if the EPM should be retrained, according to some embodiments. The processing circuit is configured to, in response to detecting that a triggering event has occurred, identify updated values of one or more hyper-parameters of the EPM, according to some embodiments. The processing circuit is configured to operate the building equipment based on the EPM, according to some embodiments.

In some embodiments, the processing circuit is configured to calculate a performance metric of the EPM. The triggering event includes the performance metric exceeding a threshold value, according to some embodiments.

In some embodiments, the processing circuit is configured to compare the EPM associated with the updated values of the one or more hyper-parameters to an existing EPM to determine what EPM generates more accurate predictions. The processing circuit is configured to deploy the EPM that generates more accurate predictions, according to some embodiments.

In some embodiments, the processing circuit is configured to pre-process operational data of the building equipment. The updated values of the one or more hyper-parameters are determined based on the pre-processed operational data, according to some embodiments.

In some embodiments, the processing circuit is configured to retrain the EPM based on data describing operation of the building equipment. The EPM is retrained respective to a proportion of old data and new data, according to some embodiments.

In some embodiments, the one or more hyper-parameters include at least one of a transfer learning flag or a training window.

In some embodiments, the processing circuit is further configured to switch to an older EPM in response to determining that the older EPM is more accurate than the EPM.

Another implementation of the present disclosure is a method for operating building equipment of a building, according to some embodiments. The method includes obtaining an energy prediction model (EPM) for predicting energy requirements over time, according to some embodiments. The method includes monitoring one or more triggering events to determine if the EPM should be retrained, according to some embodiments. The method includes, in response to detecting that a triggering event has occurred, identifying updated values of one or more hyper-parameters of the EPM, according to some embodiments. The method includes operating the building equipment based on the EPM to affect a variable state or condition of the building, according to some embodiments.

In some embodiments, the method includes calculating a performance metric of the EPM. The triggering event includes the performance metric exceeding a threshold value, according to some embodiments.

In some embodiments, the method includes comparing the EPM associated with the updated values of the one or more hyper-parameters to an existing EPM to determine what EPM generates more accurate predictions. The method includes deploying the EPM that generates more accurate predictions, according to some embodiments.

In some embodiments, the method includes pre-processing operational data of the building equipment. The updated values of the one or more hyper-parameters are determined based on the pre-processed operational data, according to some embodiments.

In some embodiments, the method includes retraining the EPM based on data describing operation of the building equipment. The EPM is retrained respective to a proportion of old data and new data, according to some embodiments.

In some embodiments, the one or more hyper-parameters include at least one of a transfer learning flag or a training window.

In some embodiments, the method includes switching to an older EPM in response to determining that the older EPM is more accurate than the EPM.

Another implementation of the present disclosure is a method for deploying an energy prediction model (EPM) for equipment, according to some embodiments. The method includes obtaining the EPM for predicting energy requirements over time, according to some embodiments. The method includes monitoring one or more triggering events to determine if the EPM should be retrained, according to some embodiments. The method includes, in response to detecting that a triggering event has occurred, identifying updated values of one or more hyper-parameters of the EPM, according to some embodiments. The method includes deploying the EPM for the equipment, according to some embodiments.

In some embodiments, the method includes calculating a performance metric of the EPM. The triggering event includes the performance metric exceeding a threshold value, according to some embodiments.

In some embodiments, the method includes comparing the EPM associated with the updated values of the one or more hyper-parameters to an existing EPM to determine what EPM generates more accurate predictions. The method includes deploying the EPM that generates more accurate predictions, according to some embodiments.

In some embodiments, the method includes pre-processing operational data of the equipment. The updated values of the one or more hyper-parameters are determined based on the pre-processed operational data, according to some embodiments.

In some embodiments, the method includes retraining the EPM based on data describing operation of the building equipment. The EPM is retrained respective to a proportion of old data and new data, according to some embodiments.

In some embodiments, the one or more hyper-parameters include at least one of a transfer learning flag or a training window.

DETAILED DESCRIPTION

Building HVAC Systems and Building Management Systems

Figure 1:
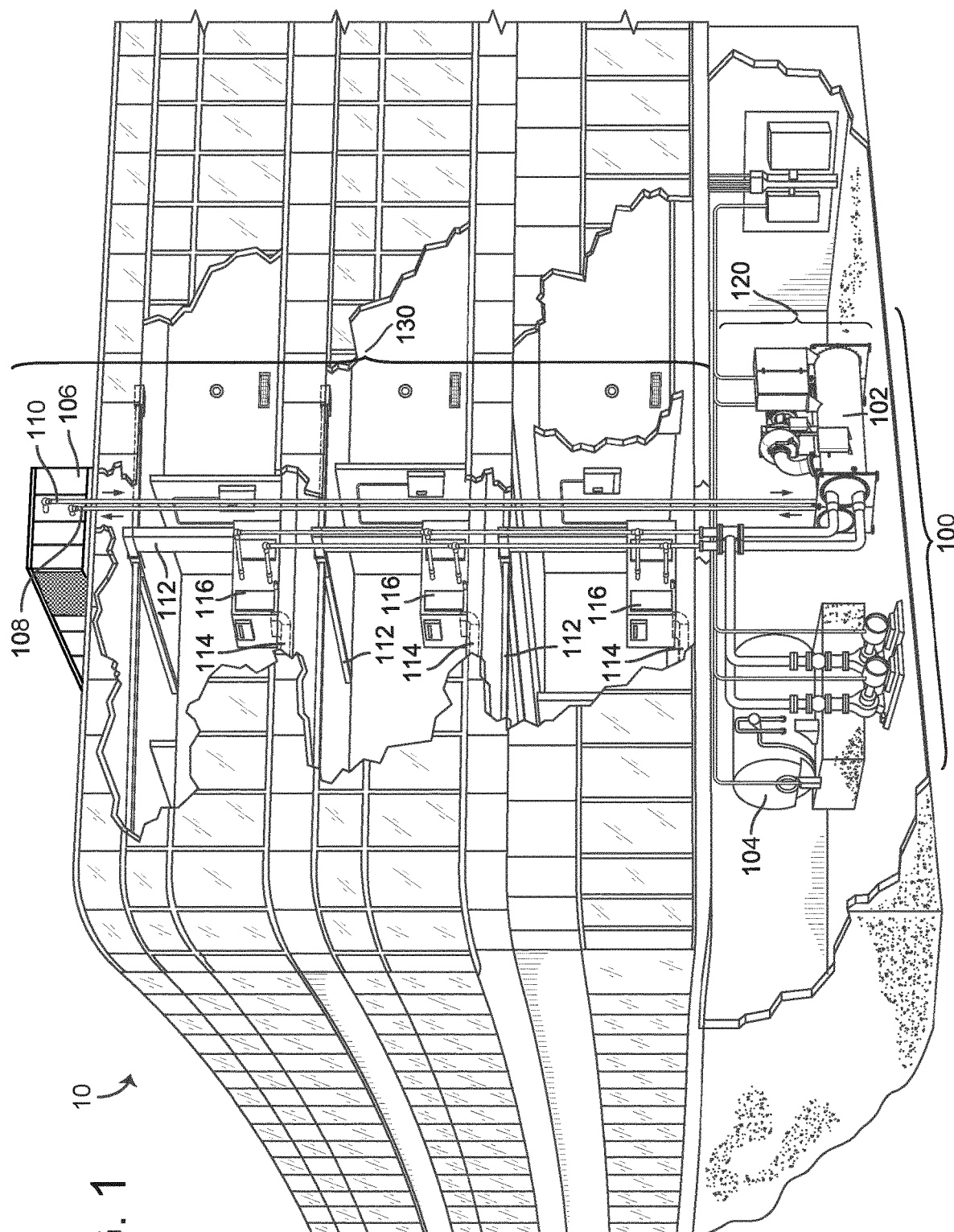
FIG. 1 is a drawing of a building equipped with a HVAC system, according to some embodiments.
Figure 2:
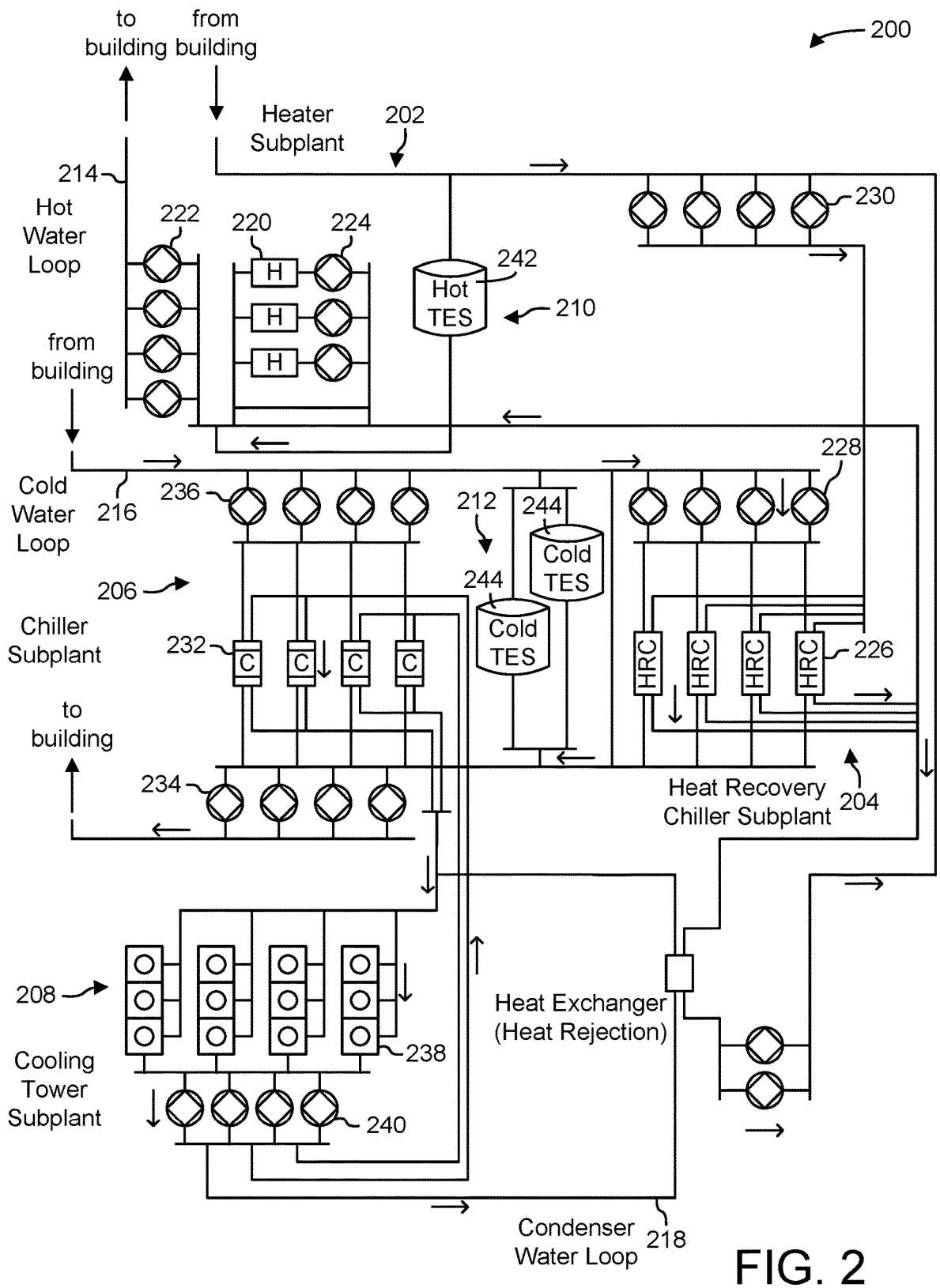
FIG. 2 is a block diagram of a waterside system which can be used to serve the heating or cooling loads of the building of FIG. 1, according to some embodiments.
Figure 3:
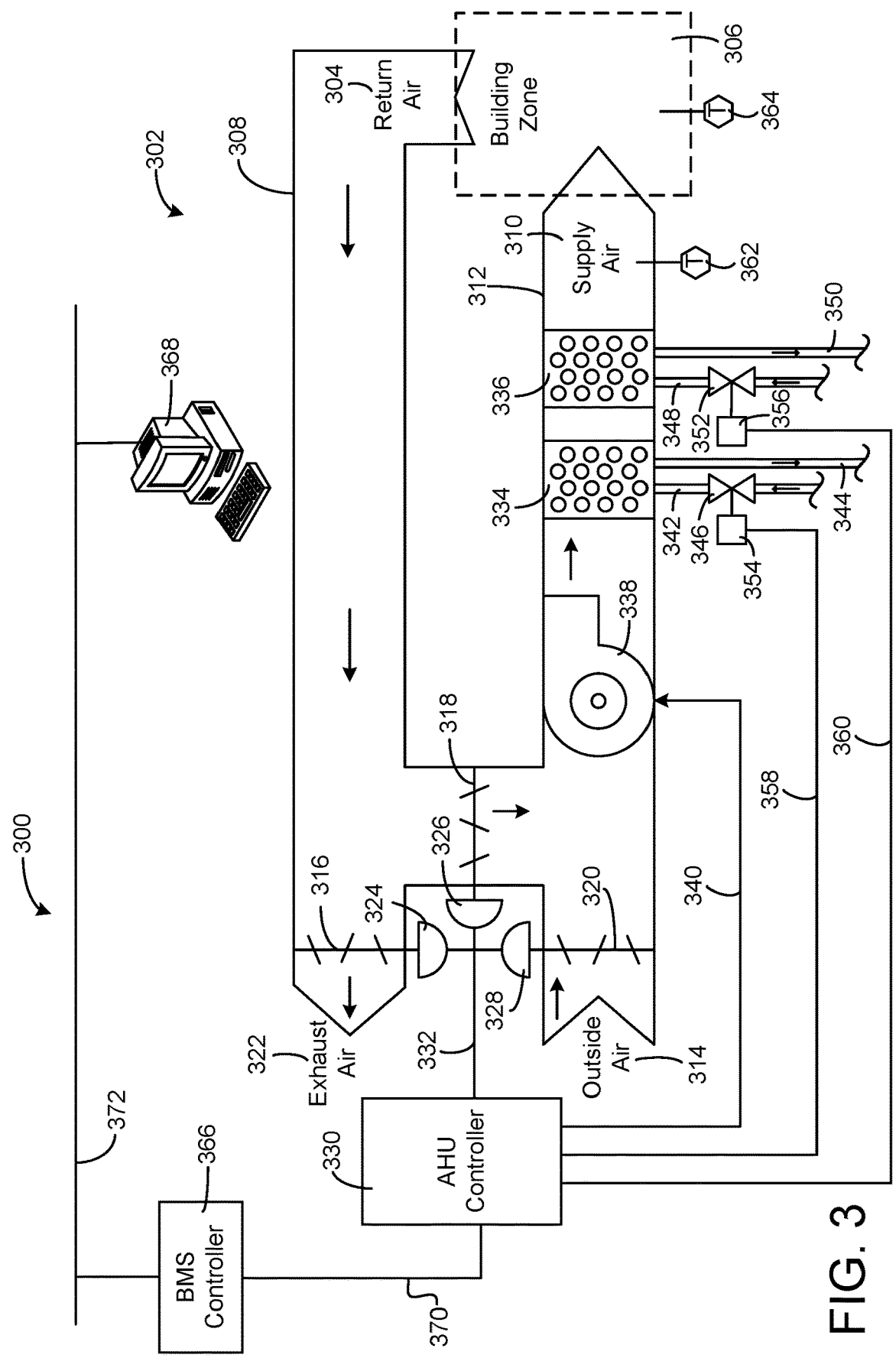
FIG. 3 is a block diagram of an airside system which can be used to serve the heating or cooling loads of the building of FIG. 1, according to some embodiments.
Figure 4:
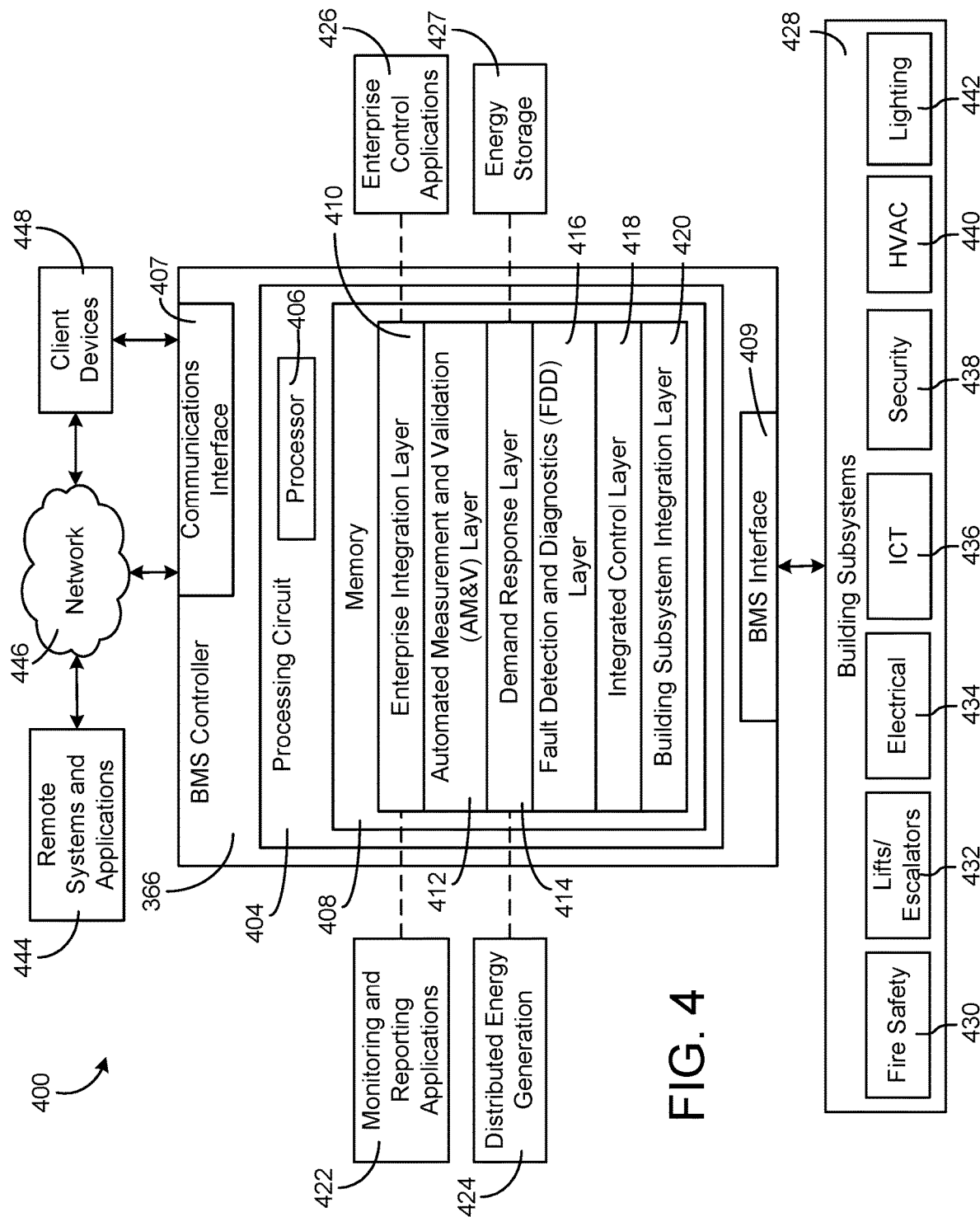
FIG. 4 is a block diagram of a building management system (BMS) which can be used to monitor and control the building of FIG. 1, according to some embodiments.
Figure 5:
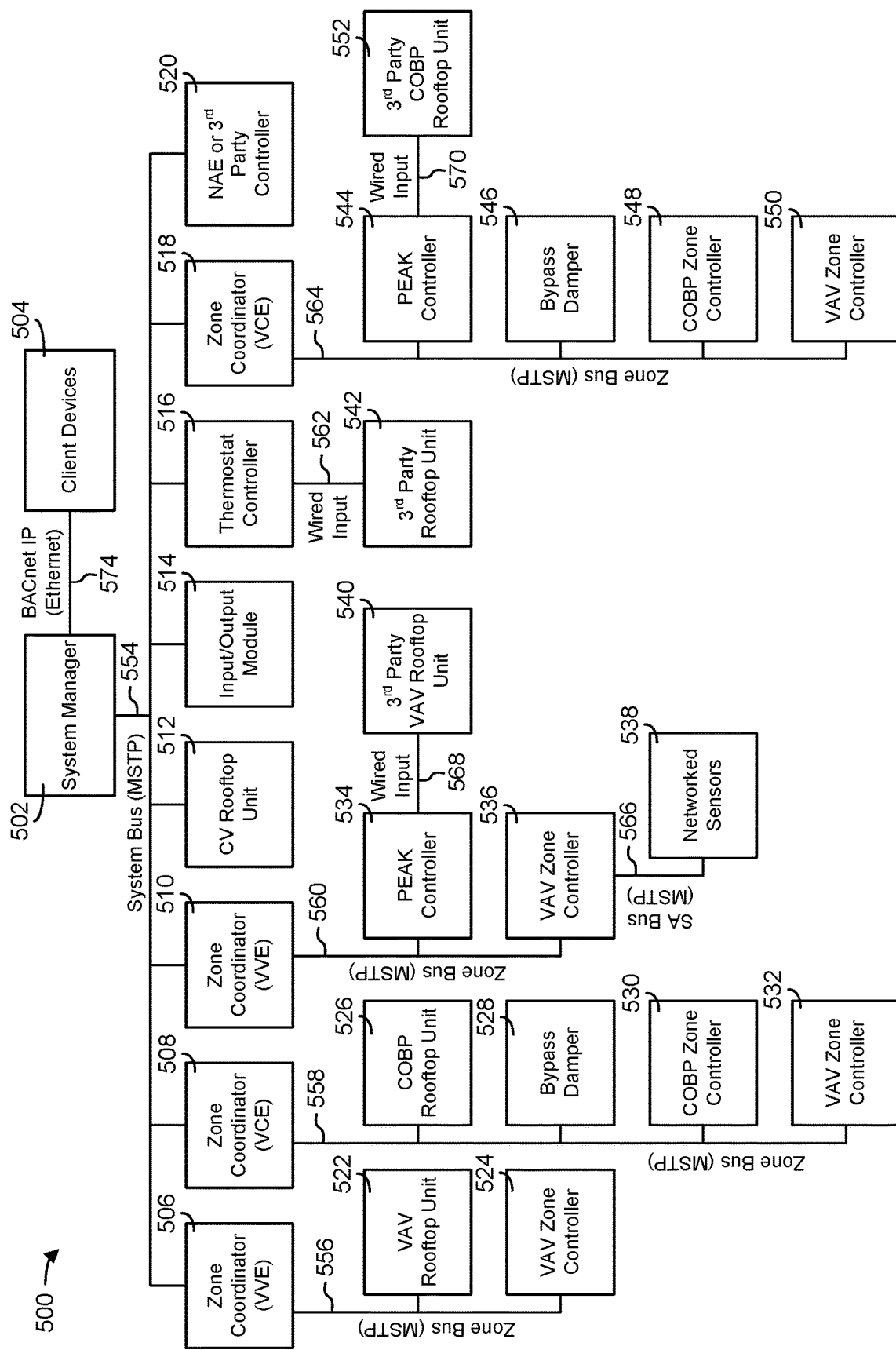
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Management System with Energy Prediction Model

Referring generally to FIGS. 6-11, systems and methods for operating building equipment based on energy prediction models (EPMs) are shown and described, according to some embodiments. For building managers (or other users associated with a building) to be able to make appropriate decisions regarding operation of building equipment, it may be necessary to provide the building managers with forecasted energy needs several hours in advance. Based on the forecasted energy needs, building managers can plan activities to both reduce a carbon footprint of a building and to reduce a cost of electricity. In some embodiments, activities are automatically determined based on an EPM.

An EPM can be used to predict energy consumption needs over time. In some embodiments, EPMs are point forecasts in that the EPMs predict an energy need at specific points in time. In some embodiments, EPMs are probabilistic forecasts in that the EPMs can attribute probabilities to possible energy needs at various points in time. In some embodiments, EPMs take on a different formats in terms of generating predictions regarding energy needs.

Advantageously, an EPM can be generated using small amounts of historic data. For example, generation of an EPM may be possible with one month of building energy consumption data. After initial deployment of the EPM, new data may be collected for the building. The EPM can be retrained based on the newly collected data to ensure the EPM accounts for changes in building characteristics over time. Even if the EPM is trained using larger quantities of historic data (e.g., months' worth of historic data), building characteristics may nonetheless change over time due to a variety of factors. For example, building characteristics may change due to factors such as occupancy changes, equipment upgrades/maintenance, seasonal changes, changes in occupant preferences (e.g., temperature preferences), etc. As such, the EPM should be retrained to account for building characteristic changes over time.

As described in detail below throughout FIGS. 6-11, the EPM can be retrained to capture recent building characteristics. However, to reduce processing requirements for maintaining the EPM, the EPM can be retrained based on various triggers as described below. In particular, EPM performance can be monitored over time to determine how accurate predictions of the EPM are with regards to the building characteristics. These and other features of operating building equipment based on EPMs are described in detail below.

It should be noted that EPMs can be generated and utilized for other types of equipment other than building equipment. For example, EPMs may be generated and utilized for hospital equipment, electronic equipment, manufacturing equipment, other industrial equipment, etc. In other words, EPMs can be applied to various types of equipment that consume energy over time.

Figure 6:
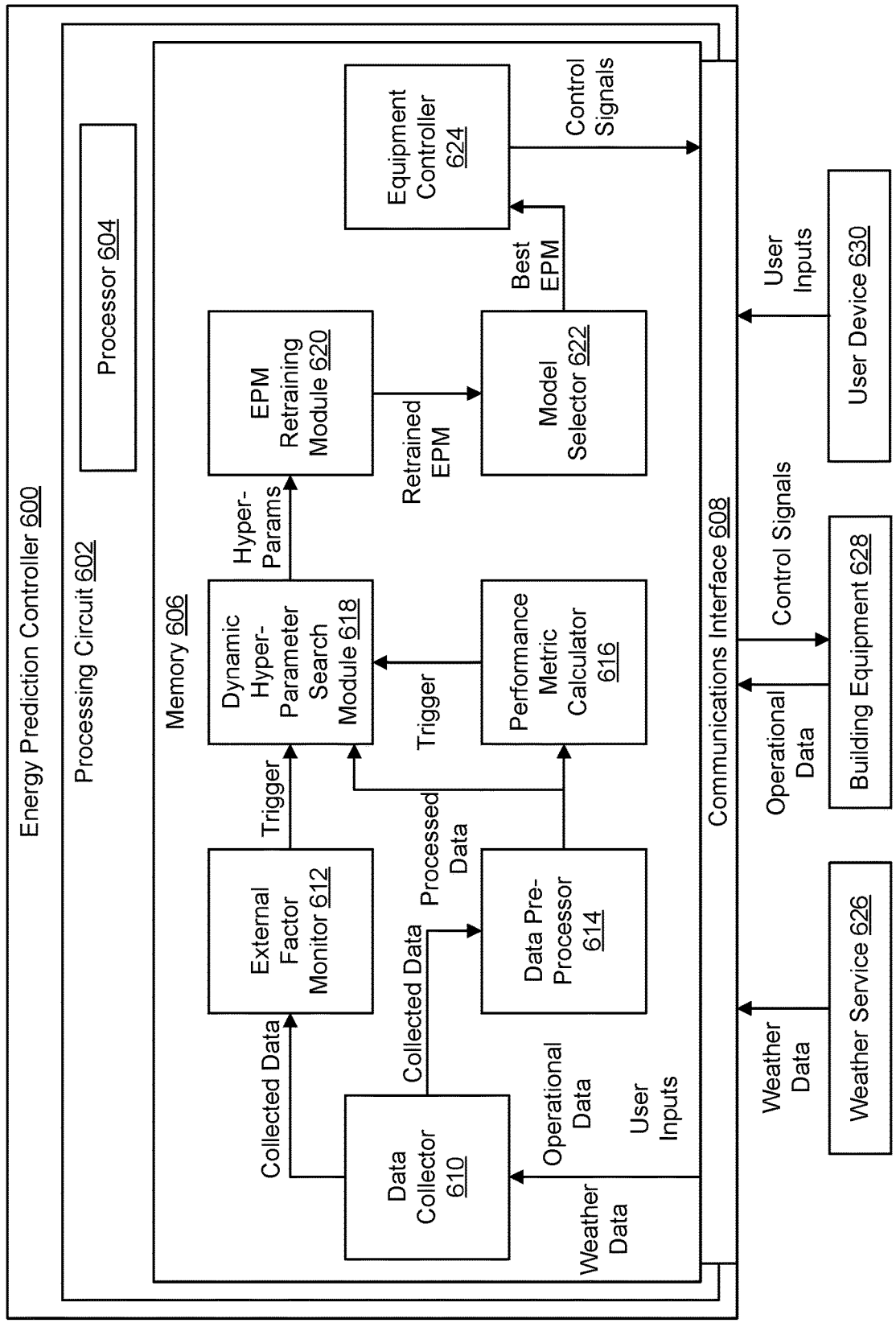
FIG. 6 is a block diagram of an energy prediction controller, according to some embodiments.

Referring now to FIG. 6, a block diagram of an energy prediction controller 600 is shown, according to some embodiments. In some embodiments, energy prediction controller 600 is a component of BMS controller 366 as described with reference to FIGS. 3 and 4. Energy prediction controller 600 can be utilized to operate building equipment to affect variable states or conditions of a building (e.g., building 10). Energy prediction controller 600 can generate control decisions based on an energy prediction model (EPM) that can predict energy requirements for a building over time. It should be noted that a building is referred to specifically for sake of example. An EPM can be generated for other types of spaces/places as well. For example, an EPM may be generated for a space (e.g., a room) within the building, a campus including multiple buildings, etc. In this way, EPMs can be used to predict energy needs for various sizes and scopes of energy consuming entities.

Energy prediction controller 600 may be hosted in various locations. For example, energy prediction controller 600 may be hosted on a local controller of a building, on a desktop computer, a mobile device, on a cloud computing system, etc. In effect, energy prediction controller 600 can be hosted in various locations so long as energy prediction controller 600 can communicate with a building of interest and building equipment therein.

Energy prediction controller 600 is shown to include a communications interface 608 and a processing circuit 602. Communications interface 608 may include wired or wireless interfaces (e.g., jacks, antennas, transmitters, receivers, transceivers, wire terminals, etc.) for conducting data communications with various systems, devices, or networks. For example, communications interface 608 may include an Ethernet card and port for sending and receiving data via an Ethernet-based communications network and/or a Wi-Fi transceiver for communicating via a wireless communications network. Communications interface 608 may be configured to communicate via local area networks or wide area networks (e.g., the Internet, a building WAN, etc.) and may use a variety of communications protocols (e.g., BACnet, IP, LON, etc.).

Communications interface 608 may be a network interface configured to facilitate electronic data communications between energy prediction controller 600 and various external systems or devices (e.g., weather service 626, building equipment 628, user device 630, etc.). For example, energy prediction controller 600 may provide control signals to building equipment 628 via communications interface 608.

Processing circuit 602 is shown to include a processor 604 and memory 606. Processor 604 may be a general purpose or specific purpose processor, an application specific integrated circuit (ASIC), one or more field programmable gate arrays (FPGAs), a group of processing components, or other suitable processing components. Processor 604 may be configured to execute computer code or instructions stored in memory 606 or received from other computer readable media (e.g., CDROM, network storage, a remote server, etc.).

Memory 606 may include one or more devices (e.g., memory units, memory devices, storage devices, etc.) for storing data and/or computer code for completing and/or facilitating the various processes described in the present disclosure. Memory 606 may include random access memory (RAM), read-only memory (ROM), hard drive storage, temporary storage, non-volatile memory, flash memory, optical memory, or any other suitable memory for storing software objects and/or computer instructions. Memory 606 may include database components, object code components, script components, or any other type of information structure for supporting the various activities and information structures described in the present disclosure. Memory 606 may be communicably connected to processor 604 via processing circuit 602 and may include computer code for executing (e.g., by processor 604) one or more processes described herein. In some embodiments, one or more components of memory 606 are part of a singular component. However, each component of memory 606 is shown independently for ease of explanation.

Memory 606 is shown to include a data collector 610. Data collector 610 can be configured to collect data from a variety of sources via communications interface 608. For example, data collector 610 may collect/receive weather data from a weather service 626, operational data from building equipment 628, user inputs from a user device 630, etc. It should be appreciated that in FIG. 6, weather service 626, building equipment 628, and user device 630 are provided as examples of possible sources of data. Data collector 610 may collect data from any source that has information applicable to energy prediction, building equipment control, etc.

Energy prediction controller 600 is shown to receive weather data from weather service 626. Weather service 626 can include a variety of sources of weather information. For example, weather service 626 may include a weather application programming interface (API) accessible by energy prediction controller 600, a local weather station that transmits weather information to energy prediction controller 600, weather sensors that measure outdoor weather conditions (e.g., near a building of interest), etc. Weather data provided by weather service 626 may include information such as an outdoor temperature, a humidity level, an air quality level, a cloud-cover ratio, etc. The weather data may include current weather data and/or predicted weather data over an upcoming time period.

Energy prediction controller 600 is shown to receive operational data from building equipment 628. Building equipment 628 can include equipment that operates to affect variables states or conditions in a building. In particular, building equipment 628 may operate to affect environmental conditions in a building. As defined herein, environmental conditions can include any conditions in a building that may affect an overall state of the building. For example, environmental conditions may include temperature, humidity, air quality, lighting, security, air pressure, etc. As such, building equipment 628 may include boilers, humidifiers, air purifiers, chillers, other heating, ventilation, or air conditioning (HVAC) equipment, security systems (e.g., locks, alarms, barriers), lighting equipment, etc. that can affect environmental conditions. In some embodiments, building equipment 628 includes some and/or all of the subsystems of building subsystems 428 as described with reference to FIG. 4.

Still referring to FIG. 6, energy prediction controller 600 is also shown to receive user inputs from user device 630. User inputs can include instructions/information provided by users via user device 630. For example, user inputs may include equipment servicing/maintenance schedules, indications of changes to building equipment 628 (e.g., additions or removals of building equipment 628), changes in operational procedures (e.g., changes in heating/cooling strategies), changes in data collection capabilities (e.g., information regarding new energy meters), manual estimations of energy needs over time, changes in building characteristics, etc.

User device 630 may be one or more personal computing devices associated with a user or occupant of the building. For example, user device 630 may be utilized by a building operator of the building. User device 630 may include any wearable or non-wearable device. Wearable devices can refer to any type of device that an individual wears including, but not limited to, a watch (e.g., a smart watch), glasses (e.g., smart glasses), bracelet (e.g., a smart bracelet), etc. User device 630 may also include any type of mobile device including, but not limited to, a phone (e.g., smart phone), a tablet, a personal digital assistant, etc. In some embodiments, user device 630 includes other computing devices such as a desktop computer, a laptop computer, etc. The user device 630 is configured to display a graphical user interface to a user and receive user input to the graphical user interface. In some embodiments, user device 630 includes a touchscreen. User device 630 may be communicable with the energy prediction controller 600 via a network, for example a WiFi network, a Bluetooth network, a cellular network, etc.

Based on received data (e.g., weather data, operational data, user inputs, etc.), data collector 610 can compile and/or provide the data to other components of memory 606. In particular, data collector 610 can provide collected data to an external factor monitor 612 and a data pre-processor 614. In some embodiments, data collector 610 provides all received information to external factor monitor 612 and/or data pre-processor 614. In some embodiments, data collector 610 selects specific information to provide to external factor monitor 612 and/or data pre-processor 614. In particular, data collector 610 may determine data requirements of external factor monitor 612 and/or data pre-processor 614 and selectively provide data based on the data requirements. In some embodiments, data collector 610 stores any received information in a database(s) for later retrieval and access. Said database(s) (not shown) may be a component of energy prediction controller 600 and/or may an external database that energy prediction controller 600 can communicate with. For example, data collector 610 may store collected information on a cloud database hosted by a cloud provider.

Memory 606 is shown to include external factor monitor 612. External factor monitor 612 can track various data points to determine if an EPM requires retraining (or generation if no EPM exists). In other words, external factor monitor 612 may track statuses of triggering events as indicated by the collected data provided by data collector 610 and determine if any triggering event has occurred. Examples of triggering events can include a certain period of time passing since a last model retraining, indications by users that the EPM should be retrained, changes to qualities of input data to the EPM, etc. Triggering events and external factor monitor 612 are described in greater detail below with reference to FIG. 7.

If external factor monitor 612 determines that a certain triggering event has occurred, external factor monitor 612 may generate a trigger message to provide the trigger message to a dynamic hyper-parameter search (DHPS) module 618. Based on the trigger message, DHPS module 618 can initiate a dynamic hyper-parameter search which is described in greater detail below. In this way, external factor monitor 612 can initiate the dynamic hyper-parameter search based on external factors. In other words, external factor monitor 612 can initiate the dynamic hyper-parameter search based on factors other than based on performance of a current EPM.

Memory 606 is also shown to include a data pre-processor 614. Data pre-processor 614 can collect data since a last EPM retraining and perform various pre-processing on said data. For example, if a last retraining of the EPM occurred at the end of January and a current time is the end of February, data pre-processor 614 can access all data gathered over the course of the month of February. Data pre-processing performed by data pre-processor 614 can include operations to clean data, purge unnecessary data, and/or other operations to increase a usefulness of data provided to a performance metric calculator 616 and/or DHPS module 618. It should be noted that data pre-processor 614 can also choose to utilize historic data prior to a last model retraining, such as prior to end-of-January in this example, to jointly pre-process old and new data.

Memory 606 is shown to include performance metric calculator 616. Performance metric calculator 616 can monitor EPM performance over time to determine if EPM performance is within acceptable bounds. In some embodiments, the acceptable bounds are automatically set by performance metric calculator 616 and/or another component of energy prediction controller 600. In some embodiments, the acceptable bounds are set by an external entity such as a user via user device 630. Performance metric calculator 616 as well as performance metrics that can be calculated and tracked by performance metric calculator 616 are described in greater detail below with reference to FIG. 8.

If performance metric calculator 616 determines the EPM is in violation of acceptable performance bounds, performance metric calculator 616 can generate and provide a trigger message to DHPS module 618. In this way, performance metric calculator 616 may include some of the functionality of external factor monitor 612. In some embodiments, performance metric calculator 616 and external factor monitor 612 are part of a single component of memory 606 for monitoring variables and generating/providing trigger messages accordingly.

If at least one of external factor monitor 612 or performance metric calculator 616 generate and provide a trigger message to DHPS module 618, DHPS module 618 can initiate a dynamic hyper-parameter search. However, if both external factor monitor 612 and performance metric calculator 616 determine no model retraining is necessary (i.e., no trigger messages are provided to DHPS module 618), external factor monitor 612 and performance metric calculator 616 can continue monitoring variables over time. In this way, external factor monitor 612 and/or performance metric calculator 616 may eventually detect a model retraining is necessary and trigger DHPS module 618 in response.

In some embodiments, external factor monitor 612 and/or performance metric calculator 616 continuously monitor variables to determine if model retraining is necessary. In this case, model retraining may be initiated quickly after the retraining is necessary to be performed. In some embodiments, external factor monitor 612 and/or performance metric calculator 616 may periodically and/or occasionally determine if model retraining is required. In this case, processing requirements for monitoring variables may be decreased. However, a time delay between when the model retraining is needed and when the need is detected may be longer than if the variables are monitored continuously.

Still referring to FIG. 6, memory 606 is shown to include DHPS module 618. In response to receiving a trigger message, DHPS module 618 can initiate a DHPS. A DHPS can include performing one or more optimizations to determine an optimal set of hyper-parameters for the EPM. It should be noted that the term "optimal" as used herein may or may not indicate an ideal result. As used herein, "optimal" may indicate a best solution of available/determined solutions. In other words, an ideal solution (i.e., a perfect solution) may or may not be identified dependent on a search/optimization strategy utilized. Specifically with regards to the DHPS performed by DHPS module 618, the DHPS may not search every possible hyper-parameter combination, and as such, may or may not find a "perfect" combination, that is, a global optimum.

As defined herein, a hyper-parameter of the EPM can include any parameter of the EPM whose initial value is set before a learning process and/or retraining process of the EPM begins. In this way, initial values of hyper-parameters may be known prior to the learning process and/or the retraining process. Examples of hyper-parameters may include, but are not limited to, a training window parameter, a transfer learning flag, a training epoch, a training batch size, a lag parameter (i.e., a number of sampling intervals of data that forms 'x' of training samples), model architecture parameters (e.g., a number of neural network layers, a hidden layer size if a long-short term memory (LSTM) model is used, a number of stack of LSTMs, etc.), and/or other appropriate parameters. Specifically, the transfer learning flag may indicate if model weights will be initialized with weights of a currently deployed model. The training window parameter can indicate a proportion of old and new data to use that carries useful information for modeling.

To perform the DHPS, DHPS module 618 can perform an optimization process to test various combinations of hyper-parameters to determination what combination of hyper-parameters results in the best energy requirement predictions. DHPS module 618 can utilize processed data provided by data pre-processor 614 in analyzing hyper-parameter combinations. Specifically, for each hyper-parameter combination analyzed, DHPS module 618 can evaluate a relative performance of each combination and determine what combination provides the best performance.

As it may be computationally inefficient to test every combination of hyper-parameters, DHPS module 618 may select specific combinations for analysis based on certain criteria. For example, DHPS module 618 may determine hyper-parameters of an EPM currently in use and analyze combinations of hyper-parameters similar to that to the EPM currently in use. This strategy intuitively makes sense as the EPM currently in use was the optimal model of a previous retraining process, and therefore has hyper-parameters that may be relatively appropriate. As another example, DHPS module 618 may eliminate and/or hone in on certain combinations based on other tested combinations. In this case, if a certain combination of hyper-parameters results in extremely poor performance, similar combinations may likewise be eliminated from consideration, thereby reducing a number of tested combinations. Alternatively, if a certain combination results in extremely high performance, similar combinations can likewise be tested, thereby focusing the search on a certain range of hyper-parameter values. It should be noted that for each hyper-parameter combination tested by DHPS module 618, a dimensionality of the combinations may remain constant. In other words, DHPS module 618 may maintain the same number of hyper-parameters in between each combination tested, and only change actual values of the hyper-parameters themselves. DHPS module 618 and the DHPS are described in greater detail below with reference to FIG. 9.

Based on the DHPS, an optimal combination of hyper-parameters for the EPM can be automatically and/or dynamically selected. The selected combination of hyper-parameters can be integrated into the EPM by DHPS module 618. Afterwards, DHPS module 618 can provide the EPM to EPM retraining module 620. In some embodiments, DHPS module 618 provides the selected combination of hyper-parameters and provides said combination to EPM retraining module 620 such that EPM retraining module 620 can integrate the combination into the EPM. It should be appreciated that by selecting a specific combination of hyper-parameters, the EPM is not only retrained, but specific parameters of the EPM can be selectively updated to improve performance of the EPM. In other words, qualities of the EPM are changing as opposed to just training data used to train the EPM. Examples of qualities may include, but are not limited to, an architecture of the EPM, how far into the future the EPM is designed to predict, etc.

Memory 606 is shown to include EPM retraining module 620. EPM retraining module 620 can perform a model retraining process to update the EPM. EPM retraining module 620 can utilize training data collected by data collector 610 to retrain the EPM. EPM retraining module 620 can utilize both old training data and new training data to retrain the EPM. Specifically, EPM retraining module 620 may train the EPM respective to a training window parameter optimized by DHPS module 618 that indicates a proportion of old and new data to utilize. For example, the training window parameter may define the proportion such that the EPM is retrained using 80% new data and 20% old data. As another example, the training window parameter may define the proportion such that the EPM is retrained using 50% old data and 50% new data. In some embodiments, the proportion is instead defined by a user, automatically by EPM retraining module 620, etc. For example, a user may define a proportion that overrides the training window parameter. In some embodiments, the training window parameter also defines a total length of training data (i.e., a number of training samples), in addition to the proportion of new and old data. Differences between old and new data can be defined based on a variety of qualifiers. For example, new data may be defined by any data collected since a last model retraining whereas old data may be defined by data collected prior to the last model retraining. As another example, old and new data may be defined based on an amount of time since the data was collected (e.g., old data can be defined as data gathered over a month ago). By utilizing data respective of the training window, a quality of retraining of the EPM can be improved. To retrain the EPM, EPM retraining module 620 may initiate a learning process to retrain how the EPM associates certain inputs to certain outputs. In the learning process, parameters of the EPM can be updated. However, in the learning process, the hyper-parameters set by DHPS module 618 may remain untouched. In this way, a quality of the retrained EPM can be maximized respective to available data.

Still referring to FIG. 6, memory 606 is shown to include a model selector 622. Model selector 622 can perform a model selection process to identify a best available model to be used for controlling building equipment 628. As DHPS module 618 may not perform an exhaustive search of all hyper-parameter combinations, a newly retrained EPM may or may not be better than an existing EPM (i.e., a currently deployed EPM). As such, model selector 622 can compare the newly retrained EPM with the existing EPM to determine which model provides better overall performance and quality of energy need predictions. In this case, the newly retrained EPM may only replace the existing EPM if the newly retrained EPM results in better performance. To compare the models, model selector 622 may pass data on a recent test window through each EPM and determine which EPM results in more accurate predictions.

In some embodiments, model selector 622 compares multiple EPMs beyond the newly retrained EPM and the existing EPM. For example, model selector 622 may store seasonal EPMs that are utilized during specific seasons. In this case, model selector 622 may have a "winter" EPM specific to building characteristics in winter, a "summer" EPM specific to building characteristics in summer, etc. During comparisons, model selector 622 may compare the newly retrained EPM, the existing EPM, and an EPM associated with a current season to determine a most accurate model. Comparing predictions of multiple models can ensure that better EPMs are utilized over time.

Model selector 622 can provide a selected EPM to an equipment controller 624. Equipment controller 624 can utilize the selected EPM to generate control signals to operate building equipment 628. By utilizing the selected EPM, equipment controller 624 can forecast energy needs into the future and plan activities to reduce a carbon footprint and a total cost of electricity over time. For example, equipment controller 624 may utilize the selected EPM to determine required loads of the building and generate control signals that operate building equipment 628 during non-peak demand charge times to reduce an overall cost of electricity whilst still fulfilling the load demands of the building.

In some embodiments, model selector 622 provides the selected EPM to a device/system external to energy prediction controller 600. For example, model selector 622 may provide the selected EPM to user device 630 (e.g., via communications interface 608) such that a user (e.g., a building owner) can plan activities accordingly. As another example, model selector 622 may provide the selected EPM to a separate controller that operates building equipment (e.g., a model predictive control controller). In essence, model selector 622 can provide the selected EPM to any device, component, system, etc. internal to or separate from energy prediction controller 600.

Figure 7:
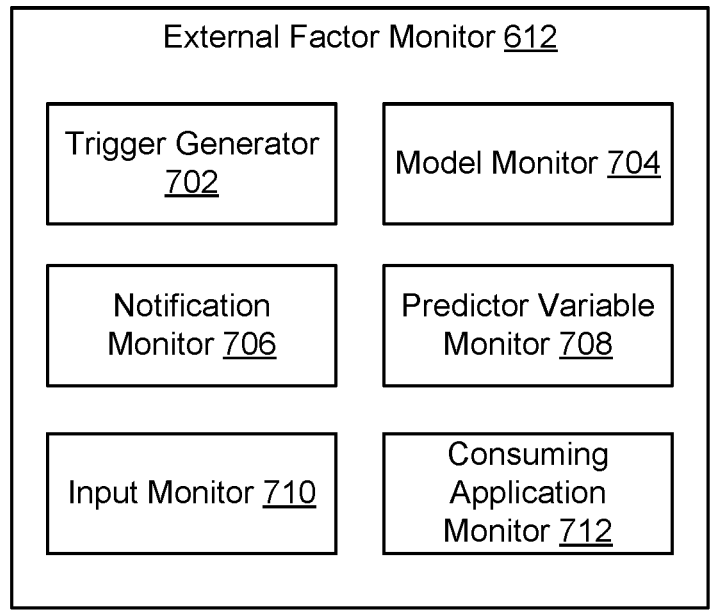
FIG. 7 is a block diagram of an external factor monitor of the energy prediction controller of FIG. 6, according to some embodiments.

Referring now to FIG. 7, a block diagram of external factor monitor 612 in greater detail is shown, according to some embodiments. The components of external factor monitor 612 shown in FIG. 7 are given for sake of example. External factor monitor 612 may include less, different, and/or additional components as compared to what is shown in FIG. 7. Components of external factor monitor 612 can utilize collected data provided by data collector 610 in determining whether a DHPS and a model retraining process should be initiated.

External factor monitor 612 is shown to include a trigger generator 702. Trigger generator 702 can generate triggers messages that can be provided to DHPS module 618. Trigger generator 702 can generate triggers messages in response to indications by other components of external factor monitor 612. For example, a model monitor 704 of external factor monitor 612, described in detail below, may indicate to trigger generator 702 that no EPM exists and therefore a new EPM should be generated. Based on the indication, trigger generator 702 can generate a trigger message and provide the trigger message to DHPS module 618.

In some embodiments, trigger generator 702 is configured to generate a trigger message after a certain amount of time such that a retraining process is performed periodically. In this way, an EPM can be retrained regardless of whether bounds of other variables are violated. Periodically updating the EPM can ensure that the EPM that the EPM is reflective of newly obtained data.

In some embodiments, external factor monitor 612 includes model monitor 704. Model monitor 704 can track whether or not an EPM exists and/or whether an EPM is being utilized. If no EPM exists, model monitor 704 may provide an indication to trigger generator 702 to generate and transmit a trigger message. Likewise, if model monitor 704 determines that an EPM exists but is not being utilized (e.g., the EPM was disabled from use by a user), model monitor 704 may provide the indication to trigger generator 702.

In some embodiments, external factor monitor 612 includes a notification monitor 706. Notification monitor 706 can analyze collected data provided by data collector 610 to determine if any user inputs are provided that may indicate updating of the EPM is required. In other words, notification monitor 706 can determine if any changes to building characteristics are indicated in user inputs. For example, notification monitor 706 may analyze the collected data to detect servicing/maintenance notifications for building equipment, notifications regarding replacement of building equipment, changes in operational procedures (e.g., new heating/cooling strategies), changes in how data is collected (e.g., new energy meters or other instruments are installed), an explicit request by a user to update the EPM, etc. In this way, user inputs can be used to determine if an update to the EPM is required.

In some embodiments, external factor monitor 612 includes a predictor variable monitor 708. Predictor variable monitor 708 can analyze the collected information provided by data collector 610 to determine whether any new predictor variables are available. Predictor variables can include variables that can be used to refine energy need predictions. For example, predictor variable monitor 708 may identify that an occupancy count has become available as a predictor variable. The occupancy count can provide insights into how energy needs of the building may change over time due to an amount of people in the building. As such, the EPM can be updated to reflect the occupancy count. Therefore, responsive to a detection of a new predictor variable, predictor variable monitor 708 can indicate to trigger generator 702 to generate and provide a new trigger message to DHPS module 618.

In some embodiments, external factor monitor 612 includes an input monitor 710. Input monitor 710 can track various input variables utilized by the EPM for quality changes. For example, the EPM may utilize a weather forecast provided by weather service 626. If input monitor 710 determines that a quality of the weather forecast has significantly degraded, input monitor 710 may determine that the EPM should be updated. As another example, input monitor 710 may track occupant-initiated setpoints for environmental conditions such as temperature. If the occupant-initiated setpoints change significantly (e.g., an occupant raises a temperature setpoint by 5 degrees Fahrenheit), input monitor 710 may determine occupant preferences have changed and that the EPM should be updated accordingly. As such, input monitor 710 can indicate to trigger generator 702 to generate and provide a new trigger message to DHPS module 618.

In some embodiments, external factor monitor 612 includes a consuming application monitor 712. Consuming application monitor 712 can track changes in requirements of an application that utilizes (consumes) energy predictions of the EPM. For example, equipment controller 624 may include a model predictive control (MPC) application that utilizes the energy predictions. If the MPC application switches to requiring energy predictions at 15 minute sampling rates from hourly sampling rates, consuming application monitor 712 may determine the EPM should be updated. As another example, if the MPC switches to requiring predictions 48 hours into the future from 24 hours ahead, consuming application monitor 712 may determine the EPM should be updated. Responsive to a determination that the EPM should be updated, consuming application monitor 712 can indicate to trigger generator 702 to generate and provide a new trigger message to DHPS module 618.

As mentioned above, the components of external factor monitor 612 are given purely for sake of example. External factor monitor 612 may include any appropriate components for analyzing external factors that may necessitate an update of the EPM.

Figure 8:
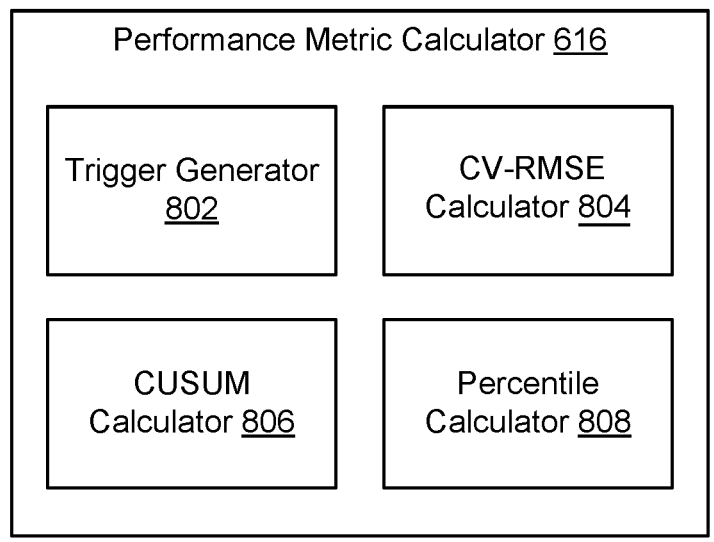
FIG. 8 is a block diagram of a performance metric calculator of the energy prediction controller of FIG. 6, according to some embodiments.

Referring now to FIG. 8, a block diagram of performance metric calculator 616 in greater detail is shown, according to some embodiments. As with external factor monitor 612 as described with reference to FIG. 7, components of performance metric calculator 616 as shown in FIG. 8 are given purely for sake of example. Performance metric calculator 616 can include any appropriate component for monitoring one or more performance metrics of the EPM.

Performance metric calculator 616 is shown to include a trigger generator 802. In some embodiments, trigger generator 802 is similar to and/or the same as trigger generator 702 of external factor monitor 612 as described with reference to FIG. 7. In particular, trigger generator 802 can generate and provide a trigger message to DHPS module 618 responsive to a component of performance metric calculator 616 determining an update of the EPM may be required.

Performance metric calculator 616 is shown to include a coefficient of variation root mean squared error (CV-RMSE) calculator 804. CV-RMSE calculator 804 can calculate a CV-RMSE over a time period (e.g., over n days). To calculate the CV-RMSE, CV-RMSE calculator 804 may first calculated a root mean squared error (RMSE) for the last n days (or some other time period) based on the following equation:

$$RMSE = \sqrt{\frac{1}{N}\sum_{i=1}^{n}(x_i - \hat{x}_i)^2}$$

where $x_i$ indicates an actual energy required and $\hat{x}_i$ indicates a predicted energy based on the EPM. Based on the RMSE, CV-RMSE calculator 804 can calculate the CV-RMSE using the following equation:

$$cv_{rmse} = \frac{RMSE}{\frac{1}{N}\sum_{i=1}^{n}(x_i)} \times 100\%$$

where $cv_{rmse}$ is the CV-RMSE.

If the CV-RMSE is calculated, CV-RMSE calculator 804 can compare the CV-RMSE with a threshold on CV-RMSE $T_{cv,rmse}$. In particular, CV-RMSE calculator 804 can determine that the EPM should be updated responsive to determining that $$cv_{rmse}[t] > T_{cv,rmse}$$

where $cv_{rsme}[t]$ is the CV-RMSE at retraining instance t. In this case, a retraining instance may refer to a time instance when performance metric calculator 616 calculates various metrics such as CV-RMSE.

Performance metric calculator 616 is also shown to include a cumulative sum (CUSUM) calculator 806. CUSUM calculator 806 can calculate a CUSUM of a CV-RMSE differential and determine if said CUSUM is acceptable relative to some threshold value(s). To calculate the CUSUM of the CV-RMSE differential, CUSUM calculator 806 can utilize the following equations:

$$\Delta cv_{rmse}[t] = cv_{rmse}[t] - cv_{rmse}[t-1]$$

$$S[t] = \max(0, S[t-1] + \Delta cv_{rmse}[t])$$

where $cv_{rsme}[t]$ is the CV-RMSE at current retraining instance t as defined above, $\Delta cv_{rsme}[t]$ is the CV-RMSE differential at instance t, and S[t] is the CUSUM of CV-RMSE differential at instance t.

If the CUSUM of CV-RMSE differential is calculated, CUSUM calculator 806 can compare the CUSUM of CV-RMSE differential to a threshold on CUSUM $T_s$ to determine if the EPM should be updated. In particular, CUSUM calculator 806 may determine that EPM should be updated responsive to determining that $S[t] > T_s$.

Performance metric calculator 616 is also shown to include a percentile calculator 808. Percentile calculator 808 can calculate a percentile of CV-RMSE as averaged over the last n days (or some other time period). Percentile calculator 808 can calculate the percentile of CV-RMSE over a distribution of CV-RMSE calculated in past retraining epochs. To calculate the percentile of CV-RMSE, percentile calculator 808 can utilize the following equations:

$$cdf(cv_{rmse}[\tau]), \tau \in \{t, t-1, \ldots, t-M\}$$

$$v = cdf(cv_{rmse}[t])$$

where $cdf(cv_{rsme}[\tau])$ is a cumulative distribution function (CDF) of CV-RMSE calculated over a past M retraining instances and $v = cdf(cv_{rsme}[t])$ is a CDF of CV-RMSE calculated in a current retraining instance. If percentile calculator 808 determines the percentile of CV-RMSE is not in an adequate percentile, percentile calculator 808 can indicate to trigger generator 802 that the EPM should be updated.

If the percentile of CV-RMSE is calculated, percentile calculator 808 can compare the percentile with a threshold on percentile. For example, if CV-RMSE is over a $90^{th}$ percentile of previously observed CV-RMSE, percentile calculator 808 may determine an update to the EPM should be triggered. In particular, can determine if:

$$v = cdf(cv_{rmse}[t]) > T_{cdf}$$

where $T_{cdf}$ is the threshold on the percentile. Advantageously, comparing the CV-RMSE to previously observed CV-RMSEs can ensure that the threshold on percentile is relative and is based on the building's predictability and not on unrealistic absolute metrics. In other words, a specific threshold may not be required to be selected. Rather, the threshold can be more dynamic to account for changing building characteristics. As should be appreciated, this can provide additional confidence in determining whether the EPM should be updated.

Figure 9:
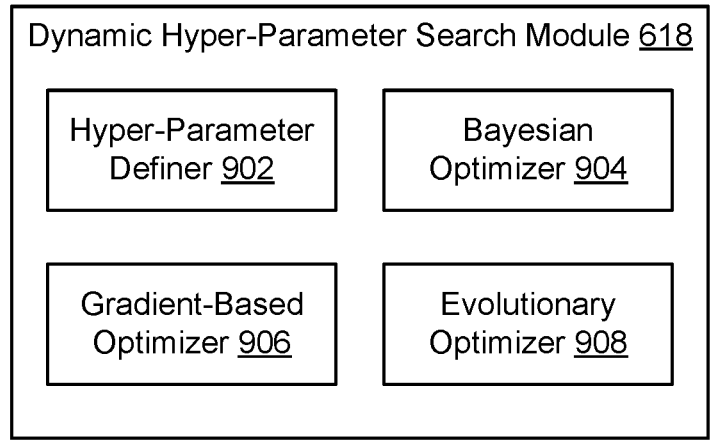
FIG. 9 is a block diagram of a dynamic hyper-parameter search module of the energy prediction controller of FIG. 6, according to some embodiments.

Referring now to FIG. 9, a block diagram of DHPS module 618 in greater detail is shown, according to some embodiments. As with external factor monitor 612 and performance metric calculator 616 as described with reference to FIGS. 6 and 7, the components of DHPS module 618 in FIG. 9 are provided for sake of example. DHPS module 618 can include any appropriate components for determining optimal values of hyper-parameters of an EPM.

DHPS module 618 is shown to include a hyper-parameter definer 902. Hyper-parameter definer 902 can define hyper-parameters to be included in the EPM. Hyper-parameter definer 902 can define hyper-parameters across various dimensions. For example, hyper-parameter definer 902 may define hyper-parameters including, a transfer learning flag, a training window, a training epoch, a training batch size, a lag parameter, a number of neural network layers, a hidden size (e.g., if an LSTM is utilized), a number of stacks of LSTMs, etc. Hyper-parameters defined by hyper-parameter definer 902 can be used in testing various combinations of hyper-parameters for the EPM.

DHPS module 618 is also shown to include a Bayesian optimizer 904, a gradient-based optimizer 906, and an evolutionary optimizer 908. Accordingly, Bayesian optimizer 904 can perform a Bayesian optimization, gradient-based optimizer 906 can perform a gradient-based optimization, and evolutionary optimizer 908 can perform an evolutionary optimization. Each of these optimizations is given for sake of example. Other optimizations can be used in determining optimal values of hyper-parameters of the EPM.

In some embodiments, DHPS module 618 utilizes one of optimizers 904-908 to determine optimal values of hyper-parameters. In this case, output of the specific optimization performed can be used as values of the hyper-parameters. In some embodiments, multiple optimizations are performed. For example, each of optimizers 904-908 may perform an associated optimization. If multiple optimizations are performed, DHPS module 618 may compare results of each optimization and determine what combination of hyper-parameters is most appropriate. In this way, multiple optimization strategies can be applied to improve quality of the hyper-parameters of the EPM.

In some embodiments, DHPS module 618 performs other search processes to determine an optimal combination of hyper-parameter values. For example, DHPS module 618 may perform an exhaustive search of all hyper-parameter value combinations. While an exhaustive search may be more computationally intensive as compared to optimizations performed by optimizers 904-908, the exhaustive search may ensure ideal values of the hyper-parameters are identified. This can be particularly useful for buildings in which building characteristics do not change often, and as such, a single EPM may be utilized for a long time frame. Therefore, ensuring quality of the EPM may be worth computational expenditure in identifying hyper-parameter values if DHPS is invoked only occasionally.

Figure 10:
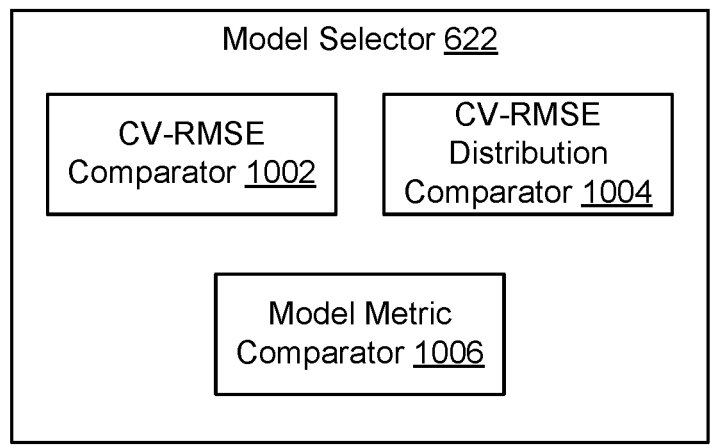
FIG. 10 is a block diagram of a model selector of the energy prediction controller of FIG. 6, according to some embodiments.

Referring now to FIG. 10, a block diagram of model selector 622 in greater detail is shown, according to some embodiments. Similar to external factor monitor 612, performance metric calculator 616, and DHPS module 618 as described with reference to FIGS. 7-9, components of model selector 622 are shown purely for sake of example. Model selector 622 can include any appropriate model for selecting an EPM to be utilized in energy predictions.

It should be noted that the comparisons described below are described as between a newly constructed EPM (i.e., a model with hyper-parameters updated by DHPS module 618) and an existing EPM. However, determinations regarding what model to use as performed by components of model selector 622 can be performed based on more than two models, according to some embodiments. For example, comparisons may be performed between the newly constructed EPM, the existing EPM, and a seasonal EPM to determine a most appropriate model. As such, comparisons between two EPMs should not be construed as limiting on the present disclosure.

Model selector 622 is shown to include a CV-RMSE comparator 1002. Based on a model with optimized hyper-parameters defined by DHPS module 618, CV-RMSE comparator 1002 can compare a metric (M) of CV-RMSE on the newly constructed model with that of an existing model on a recent test window of data. In particular, CV-RMSE comparator 1002 can compare values of the newly constructed EPM and existing EPM to determine if the existing EPM has a higher CV-RMSE as compared to the newly constructed EPM. If so, CV-RMSE comparator 1002 may determine that the existing model should be replaced by the newly constructed EPM. Said determination can be mathematically represented as:

$$cv_{rsme}^{new\_model}[t] < cv_{rmse}^{old\_model}[t]$$

where $cv_{rsme}^{new\_model}[t]$ is a CV-RMSE value of the newly constructed EPM at time instance t and $cv_{rsme}^{old\_model}[t]$ is a CV-RMSE value of the existing EPM at time instance t. In essence, whatever EPM has a lower CV-RMSE can be deployed.

Model selector 622 is also shown to include a CV-RMSE distribution comparator 1004. To determine what EPM to utilize, CV-RMSE distribution comparator 1004 can calculate a distribution of daily CV-RMSE values over a test window for both the newly constructed EPM and the existing EPM. Further, CV-RMSE distribution comparator 1004 can calculate a measure (e.g., a function of mean, standard deviation, number of samples) of CV-RMSE and pick a model with a lowest measure. In particular, using standard deviation and number of samples can balance low CV-RMSE with reliability of CV-RMSE.

Mathematically, CV-RMSE distribution comparator 1004 can define the following variables:

$$cv_{rmse}[t] = \text{mean}([cv_{rmse}[t,1], cv_{rmse}[t,2], \ldots, cv_{rmse}[t,D]])$$

where $cv_{rmse}[t, d]$ is the CV-RMSE calculated per-day on day d of current retraining instance t and D is a number of test window days for retraining instance t. Further, CV-RMSE distribution comparator 1004 can define a reliability index as:

$$\rho(cv_{rmse}[t]) = \frac{D}{\sigma(cv_{rmse}[t])}$$

where $\sigma(cv_{rmse}[t])$ is a standard deviation of CV-RMSE samples $[cv_{rmse}[t,1], cv_{rmse}[t,2], \ldots, cv_{rmse}[t,D]]$. In this case, CV-RMSE distribution comparator 1004 can replace the existing EPM with the newly constructed EPM if:

$$cv_{rmse}^{new\_model}[t] < cv_{rmse}^{old\_model}[t]$$

AND $$\rho(cv_{rmse}^{new\_model}[t]) > T_{reliability}$$

where $T_{reliability}$ is a threshold on reliability.

Model selector 622 is also shown to include a model metric comparator 1006. Model metric comparator 1006 can utilize both the newly constructed EPM and the existing EPM and can switch between them as needed to improve quality of energy predictions. In particular, model selector 622 can monitor a metric M between the hyper-parameter optimized EPM, the currently deployed EPM (which may or may not be the same as the hyper-parameter optimized EPM), and the existing EPM. Model metric comparator 1006 can track M for each model and can switch the currently deployed model out with previously deployed model in the case that M improves for the previously deployed model beyond the currently deployed model. Keeping the previously deployed model can ensure reversal to the old model can occur if the currently deployed model deteriorates in prediction accuracy. Said deterioration may occur, for example, if a temporary shift in building characteristics lead to the model update and deployment of the hyper-parameter optimized model.

Figure 11:
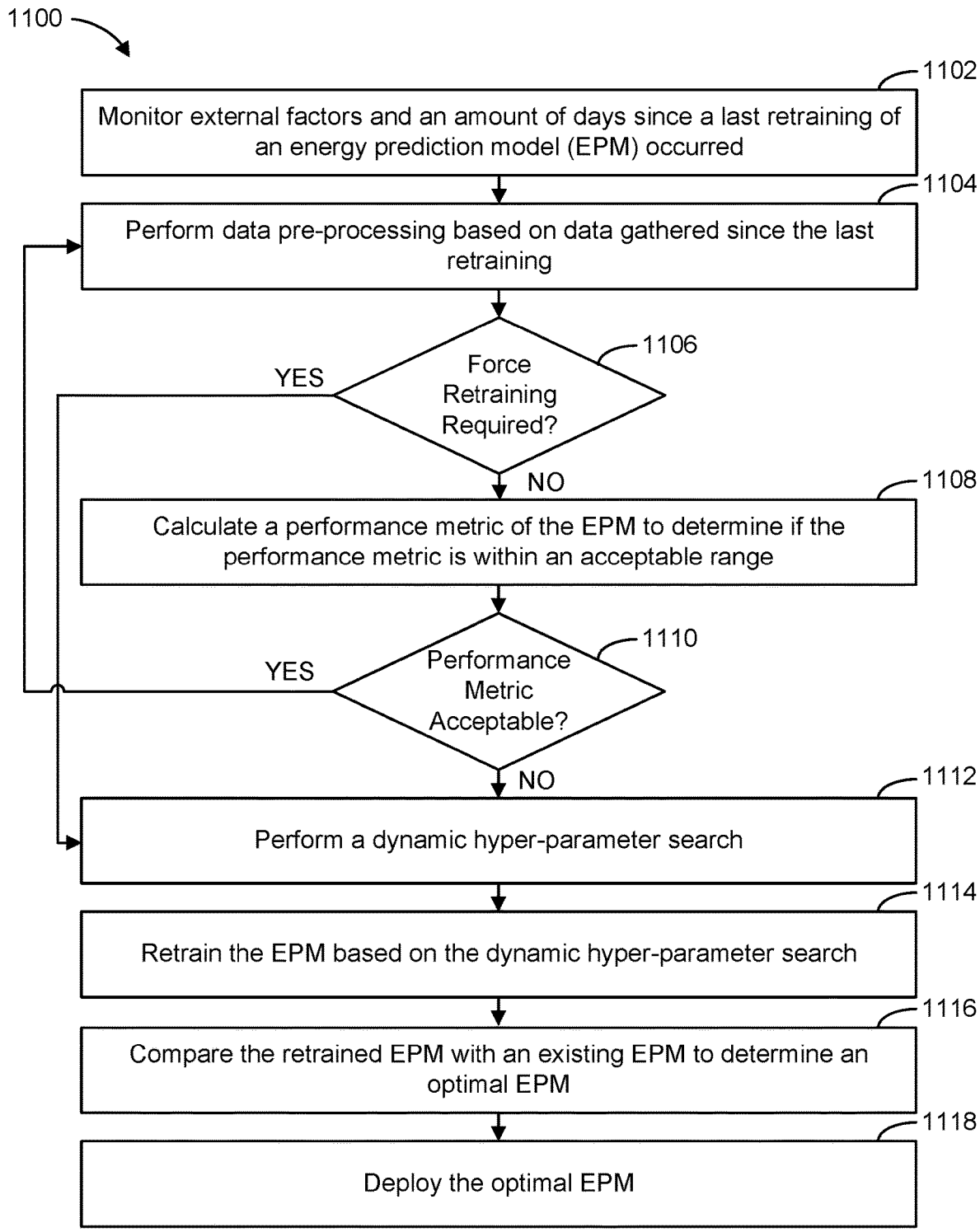
FIG. 11 is a flow diagram of a process for deploying an energy prediction model, according to some embodiments.

Referring now to FIG. 11, a flow diagram of a process 1100 for deploying an EPM is shown, according to some embodiments. In some embodiments, some and/or all steps of process 1100 are performed by energy prediction controller 600. In this way, process 1100 can result in a dynamic, automatic pipeline for updating and deploying EPMs for energy predictions.

Process 1100 is shown to include monitoring external factors and an amount of days since a last retraining of an energy prediction model (EPM) occurred (step 1102). If the amount of days since the last retraining exceeds a threshold amount of days, a force retraining variable may be automatically set to true. Likewise, if any external factors (e.g., no model exists, a building manager notifies of a change, new predictor variables are available, external input quality changes, consuming application requirements change, etc.) are determined to have initiated a triggering event, the force retraining variable may be automatically set to true as well. In some embodiments, step 1102 is performed by external factor monitor 612.

Process 1100 is shown to include performing data pre-processing based on data gathered since the last retraining (step 1104). The pre-processing of data performed in step 1104 can include various operations on the data such as organizing the data, cleaning the data (e.g., merging the data into a common format), purging unnecessary data, etc. In essence, step 1104 can include any operations to improve overall quality of the data and information that can be extracted therefrom. In some embodiments, step 1104 is performed by data pre-processor 614.

Process 1100 is shown to include determining if a force retraining is required (step 1106). In effect, step 1106 can include determining if the EPM should be updated. In some embodiments, the determination in step 1106 is based on whether the force retraining variable was set to true in step 1102. If the force retraining is required (step 1106, "YES"), process 1100 can proceed to step 1112. If the force retraining is not required (step 1106, "NO"), process 1100 can proceed to step 1108. In some embodiments, step 1106 is performed by external factor monitor 612 and/or DHPS module 618.

Process 1100 is shown to include calculating a performance metric of the EPM to determine if the performance metric is within an acceptable range (step 1108). In some embodiments, step 1108 includes calculating multiple performance metrics and determining whether each is within an acceptable range. In some embodiments, step 1108 involves calculating various information based on a CV-RMSE value. For example, step 1108 may include calculating a CV-RMSE, a CUSUM of a CV-RMSE differential, a percentile of CV-RMSE as averaged over the last n days, etc. In some embodiments, step 1108 is performed by performance metric calculator 616.

Process 1100 is shown to include determining if the performance metric is acceptable (step 1110). The determination in step 1110 can be based on the calculation in step 1108. If the performance metric is acceptable (step 1110, "YES"), process 1100 can repeat beginning at step 1104. In this case, as behavior of the EPM is determined to be suitable and no force retraining is required, process 1100 may not requiring model updating/retraining. If the performance metric is unacceptable (step 1110, "NO"), process 1100 may proceed to step 1112.

Process 1100 is shown to include performing a dynamic hyper-parameter search (step 1112). In step 1112, optimal values of hyper-parameters of the EPM can be identified. In particular, step 1112 may include comparing various combinations of values of the hyper-parameters to determine a combination that results in the most accurate energy predictions. Each comparison may maintain a constant dimensionality between combinations. In other words, each comparison may change values of the hyper-parameters, but keep the same number of hyper-parameters between each combination. In some embodiments, step 1112 includes performing one or more optimizations (e.g., a Bayesian optimization, a gradient-based optimization, an evolutionary optimization, etc.) to identify an optimal combination of hyper-parameter values. In some embodiments, step 1112 includes discarding some collected data associated with the EPM. Specifically, step 1112 may include discarding old data as the old data may not be as accurate as more recent data. In some embodiments, step 1112 is performed by DHPS module 618.

Process 1100 is shown to include retraining the EPM based on the dynamic hyper-parameter search (step 1114). As a result of the DHPS performed in step 1112, an optimal combination of hyper-parameter values can be identified. Said combination can be populated in the EPM such that, prior to retraining the EPM, the hyper-parameter values are set. In this way, when retraining the EPM, other variables of the EPM may be adjusted to account for updated data, but the hyper-parameters can be constant. In this sense, step 1114 does not just include retraining the EPM, but also updating actual parameters of the EPM. In other words, the EPM itself is changing rather than just the training data. In some embodiments, step 1114 is performed by EPM retraining module 620.

Process 1100 is shown to include comparing the retrained EPM with an existing EPM to determine an optimal EPM (step 1116). It should be noted that, in some embodiments, step 1116 includes comparing additional EPMs (e.g., seasonal EPMs) to the retrained EPM and the existing EPM. Step 1116 can include performing one or more comparisons based on various metrics of the EPMs. For example, step 1116 may include comparing CV-RMSE values of the EPMs, standard deviations of the CV-RMSEs, etc. In effect, based on the comparison(s), the optimal EPM can be identified. In some embodiments, step 1116 is performed by model selector 622.

Process 1100 is shown to include deploying the optimal EPM (step 1118). Deployment of the optimal EPM can include various actions that result in some utilization of the optimal EPM. For example, deploying the optimal EPM may include providing the optimal EPM to a user device of a user, using the EPM in generating control signals for building equipment, saving the optimal EPM in an EPM database, analyzing the EPM to extract additional information regarding energy prediction, generating a report describing the EPM and/or results associated therewith, auditing the EPM for accuracy, etc. As should be appreciated, deployment of the EPM performed in step 1118 can be customizable and configurable dependent on a desired usage of the EPM. In some embodiments, step 1118 is performed by model selector 622 and/or other various components of energy prediction controller 600.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
    building equipment operable to affect a variable state or condition of a building;
    a controller comprising a processing circuit configured to:
        obtain an energy prediction model (EPM) for predicting energy requirements over time;
        monitor one or more triggering events to determine if the EPM should be retrained;
        in response to detecting that a triggering event has occurred, identify updated values of one or more hyper-parameters of the EPM; and
        operate the building equipment based on the EPM.

2. The building management system of claim 1, wherein the processing circuit is further configured to:
    calculate a performance metric of the EPM;
    wherein the triggering event comprises the performance metric exceeding a threshold value.

3. The building management system of claim 1, wherein the processing circuit is further configured to:
    compare the EPM associated with the updated values of the one or more hyper-parameters to an existing EPM to determine what EPM generates more accurate predictions; and
    deploy the EPM that generates more accurate predictions.

4. The building management system of claim 1, wherein the processing circuit is further configured to pre-process operational data of the building equipment, wherein the updated values of the one or more hyper-parameters are determined based on the pre-processed operational data.

5. The building management system of claim 1, wherein the processing circuit is further configured to retrain the EPM based on data describing operation of the building equipment, wherein the EPM is retrained respective to a proportion of old data and new data.

6. The building management system of claim 1, wherein the one or more hyper-parameters include at least one of:
    a transfer learning flag; or
    a training window.

7. The building management system of claim 1, wherein the processing circuit is further configured to switch to an older EPM in response to determining that the older EPM is more accurate than the EPM.

8. A method for operating building equipment of a building, the method comprising:
    obtaining an energy prediction model (EPM) for predicting energy requirements over time;
    monitoring one or more triggering events to determine if the EPM should be retrained;
    in response to detecting that a triggering event has occurred, identifying updated values of one or more hyper-parameters of the EPM; and
    operating the building equipment based on the EPM to affect a variable state or condition of the building.

9. The method of claim 8, further comprising:
    calculating a performance metric of the EPM;
    wherein the triggering event comprises the performance metric exceeding a threshold value.

10. The method of claim 8, further comprising:
    comparing the EPM associated with the updated values of the one or more hyper-parameters to an existing EPM to determine what EPM generates more accurate predictions; and
    deploying the EPM that generates more accurate predictions.

11. The method of claim 8, further comprising pre-processing operational data of the building equipment, wherein the updated values of the one or more hyper-parameters are determined based on the pre-processed operational data.

12. The method of claim 8, further comprising retraining the EPM based on data describing operation of the building equipment, wherein the EPM is retrained respective to a proportion of old data and new data.

13. The method of claim 8, wherein the one or more hyper-parameters include at least one of:
a transfer learning flag; or
a training window.

14. The method of claim 8, further comprising switching to an older EPM in response to determining that the older EPM is more accurate than the EPM.

15. A method for deploying an energy prediction model (EPM) for equipment, the method comprising:
obtaining the EPM for predicting energy requirements over time;
monitoring one or more triggering events to determine if the EPM should be retrained;
in response to detecting that a triggering event has occurred, identifying updated values of one or more hyper-parameters of the EPM; and
deploying the EPM for the equipment.

16. The method of claim 15, further comprising:
calculating a performance metric of the EPM;
wherein the triggering event comprises the performance metric exceeding a threshold value.

17. The method of claim 15, further comprising:
comparing the EPM associated with the updated values of the one or more hyper-parameters to an existing EPM to determine what EPM generates more accurate predictions; and
deploying the EPM that generates more accurate predictions.

18. The method of claim 15, further comprising pre-processing operational data of the equipment, wherein the updated values of the one or more hyper-parameters are determined based on the pre-processed operational data.

19. The method of claim 15, further comprising retraining the EPM based on data describing operation of the equipment, wherein the EPM is retrained respective to a proportion of old data and new data.

20. The method of claim 15, wherein the one or more hyper-parameters include at least one of:
a transfer learning flag; or
a training window.

\* \* \* \* \*